(12) United States Patent
Popp et al.

(10) Patent No.: US 10,563,575 B2
(45) Date of Patent: Feb. 18, 2020

(54) ARRANGEMENT OF A SWITCHING VALVE MODULE IN A CONNECTING ROD OF A RECIPROCATING INTERNAL COMBUSTION ENGINE

(71) Applicant: Schaeffler Technologies AG & Co. KG, Herzogenaurach (DE)

(72) Inventors: Markus Popp, Frensdorf (DE); Michael Knorr, Herzogenaurach (DE); Jan Pfannenmüller, Nürnberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/307,994

(22) PCT Filed: Jun. 26, 2017

(86) PCT No.: PCT/DE2017/100535
§ 371 (c)(1),
(2) Date: Dec. 7, 2018

(87) PCT Pub. No.: WO2017/220086
PCT Pub. Date: Dec. 28, 2017

(65) Prior Publication Data
US 2019/0301364 A1 Oct. 3, 2019

(30) Foreign Application Priority Data

Jun. 24, 2016 (DE) .......................... 10 2016 211 322

(51) Int. Cl.
*F02B 75/04* (2006.01)
*F16C 7/06* (2006.01)
(Continued)

(52) U.S. Cl.
CPC ............ *F02B 75/045* (2013.01); *F15B 11/16* (2013.01); *F15B 13/01* (2013.01); *F16C 7/06* (2013.01);
(Continued)

(58) Field of Classification Search
CPC ... F02B 75/045; F15B 11/16; F15B 2211/411; F16C 7/06
See application file for complete search history.

(56) References Cited

U.S. PATENT DOCUMENTS

2015/0152794 A1* 6/2015 Paul .................. F02D 15/02
123/48 R

FOREIGN PATENT DOCUMENTS

| DE | 102012112461 A1 | 6/2014 |
| DE | 102014216532 A1 | 2/2016 |
| DE | 102014116655 A1 | 5/2016 |

* cited by examiner

Primary Examiner — Kevin A Lathers
(74) Attorney, Agent, or Firm — Matthew V. Evans (57) ABSTRACT

A switching valve module is provided in a connecting rod of a reciprocating internal combustion engine in order to control a distributing device for changing the compression ratio of a cylinder unit of the reciprocating internal combustion engine. In order to provide an arrangement of a mechanically actuated switching valve module which can be advantageously integrated into the connecting rod, the switching valve module should be arranged in a module housing of which at least partly has an outer cylindrical contour and a transverse through-bore for receiving a control slide valve, and the cylindrical section of the switching valve module can be inserted into a receiving bore in the connecting rod that is transverse to a longitudinal central axis of a connecting rod bearing eye.

11 Claims, 4 Drawing Sheets

(51) Int. Cl.
 *F15B 13/01* (2006.01)
 *F15B 11/16* (2006.01)
(52) U.S. Cl.
 CPC ...... *F15B 2211/411* (2013.01); *F15B 2211/71* (2013.01)

ARRANGEMENT OF A SWITCHING VALVE MODULE IN A CONNECTING ROD OF A RECIPROCATING INTERNAL COMBUSTION ENGINE

CROSS-REFERENCE TO RELATED APPLICATIONS

This application is the U.S. National Phase of PCT Application No. PCT/DE2017/100535 filed Jun. 26, 2017 which claims priority to DE 102016211322.4 filed Jun. 24, 2016.

TECHNICAL FIELD

This disclosure relates to an arrangement of a switching valve module in a connecting rod of a reciprocating internal combustion engine, wherein the switching valve module is provided for controlling an adjusting device for changing the compression ratio of a cylinder unit of the reciprocating internal combustion engine and is connected via oil return lines in each case to two pressure chambers of supporting cylinders of the adjusting device and to at least one discharge bore, which pressure chambers can be acted upon by a hydraulic fluid, wherein the switching valve module, which is arrangeable in a receiving bore of the connecting rod, has a control slide valve which is mechanically movable into two different switching positions and is alternately longitudinally displaceable at its two end faces by means of control surfaces of at least one actuator.

The invention furthermore also relates to a connecting rod for a reciprocating internal combustion engine having an adjustable compression ratio, the effective length of which connecting rod is adjustable in at least two stages for adjusting the compression ratio, having at least one hydraulic control device for adjusting the effective length of the connecting rod, which control device has at least one eccentric body, arranged in a piston-side connecting rod eye of the connecting rod, at least two pressure chambers of supporting cylinders in which a control piston is displaceably guided in each case, which pressure chambers can be acted upon by a hydraulic fluid, and at least two piston rods which each connect a control piston to the eccentric body, wherein the control device is adjustable via a switching valve whereof the control chamber is connected to a connecting rod bearing of the connecting rod via a fluid channel.

BACKGROUND

The compression ratio of a reciprocating internal combustion engine c refers to the ratio of the volume of the cylinder chamber as a whole to the volume of the compression chamber. By increasing the compression ratio, the efficiency of the reciprocating internal combustion engine can be increased and therefore the fuel consumption can, on the whole, be reduced. However, in the case of spark-ignited reciprocating internal combustion engines, the knocking tendency thereof increases with the increase in the compression ratio in full-load operation. Knocking is an uncontrolled self-ignition of the fuel/air mixture.

In contrast, the compression ratio could be increased in partial-load operation, in which the cylinder fill is lower, to improve the corresponding partial-load efficiency without causing the above-mentioned knocking to occur. As a result, it is expedient to operate the reciprocating internal combustion engine with a relatively high compression ratio in partial-load operation and with a comparatively reduced compression ratio in full-load operation.

Changing the compression ratio is moreover particularly advantageous for supercharged reciprocating internal combustion engines with spark ignition since, on the whole, these require a low compression ratio for supercharging, wherein the compression should be increased to improve the thermodynamic efficiency in unfavorable areas of a corresponding engine map. Moreover, the option exists of generally altering the compression ratio depending on further operating parameters of the reciprocating internal combustion engine, such as driving states of the vehicle, operating points of the internal combustion engine, signals of a knock sensor, exhaust gas values etc., for example.

Devices which are used to adjust the effective length of the connecting rod are known, inter alia, from the prior art. These are devices which are used to alter the spacing between a connecting rod bearing eye of the connecting rod, which is arranged on a crankpin of a crankshaft, and a piston pin bearing arranged in a connecting rod eye of the connecting rod. In this case, the adjustment can take place at the connecting rod eye receiving the piston pin bearing or at the connecting rod bearing eye mounted on the crankpin, whereby the position of the piston relative to the crankpin is altered in each case.

A device for altering the compression ratio of a reciprocating internal combustion engine of the generic type is known from DE 10 2012 112 461 A1. According to this, a connecting rod which is divided in the region of its connecting rod eye receives, via the bore of this connecting rod eye, an eccentric body on which a two-arm eccentric lever acts and in which a center point of a piston pin bore is arranged offset relative to a center point of the connecting rod eye. The eccentric body is guided in the bore of the connecting rod eye by a cylindrical outer circumferential surface and is designed as a slide bearing. Rotational movements of the eccentric body in the bore of the connecting rod eye take place automatically. These are triggered by the effect of inertial and gas forces of the cylinder unit, wherein the effective directions thereof change constantly during its working process. At its ends, the eccentric lever is furthermore connected via a pivot bearing in each case to a piston rod receiving the control piston, wherein the control pistons are guided in control cylinders.

A rotational movement of the eccentric body under the inertial and gas forces of the cylinder unit, and consequently a pivotal movement of the eccentric lever in one of the two directions, is enabled in that the pressure chamber of the control cylinder which is located in the direction is without pressure whilst engine oil flows into the pressure chamber of the other control cylinder at the corresponding pressure of the lubricating oil pump. This control is undertaken by a slide valve, designed as a control slide valve, of a switching device which is arranged in the vicinity of the connecting rod eye and is constructed as a switching valve. In this case, the control slide valve is mechanically displaced into one of its two switching positions so that in each case one of the pressure chambers empties without pressure into the oil pan of the reciprocating internal combustion engine and the other pressure chamber is filled with engine oil.

In this case, a housing, described as a sleeve-shaped connecting element, is inserted into a receiving bore extending parallel to the longitudinal center axis of the connecting rod bearing eye, which housing has a first and a second bore, each connected to hydraulic fluid lines, and a vent bore connected to a vent channel. The slide valve, which is longitudinally displaceable in the housing, has a T-shaped groove via which one of the two bores is optionally connected to the vent bore. To adjust the slide valve each of its two switching positions, an actuating pulse, transmitted by means of a preferably electrically actuated control element, is said to be provided.

SUMMARY

It is the object of the present disclosure to create an arrangement of a mechanically actuable switching valve module for changing the compression ratio of a cylinder unit, which can be advantageously integrated in the connecting rod.

This object is achieved by the features described herein and illustrated in the figures. Advantageous configurations are described, which can each represent an aspect of the disclosure in their own right or in various combinations with one another.

Accordingly, the arrangement of a switching valve module in a connecting rod of a reciprocating internal combustion engine is provided for controlling an adjusting device for changing the compression ratio of a cylinder unit of the reciprocating internal combustion engine. The switching valve module is connected via oil return channels in each case to two pressure chambers of supporting cylinders of the adjusting device and to at least one discharge bore, which pressure chambers can be acted upon by a hydraulic fluid, wherein the switching valve module is arrangeable in a receiving bore of the connecting rod and has a control slide valve which is mechanically movable into two different switching positions and is alternately longitudinally displaceable at its two end faces by means of control surfaces of at least one actuator.

In this case, according to the disclosure, the switching valve module should be arranged in a module housing whereof the module housing has a cylindrical outer contour, at least in sections, and a transversely extending through-bore for receiving the control slide valve, wherein the switching valve module as a whole can be inserted with its cylindrical outer contour into the receiving bore which extends transversely to a connecting rod bearing axis in a connecting rod housing. The through-bore for the control slide valve therefore extends at an angle of 90° to the longitudinal center axis of the module housing.

If the module housing is inserted into the receiving bore and the control slide valve is incorporated in its through-bore, the control slide valve extends parallel to the longitudinal center axis of the connecting rod bearing. The module housing can be designed on the whole as a cylindrical shaft end, which is introduced by one section into the receiving bore, designed as a blind hole of the connecting rod, in a region in which a connecting rod shaft merges into an upper part of the connecting rod bearing housing. The module housing is capable of being pressed into the receiving bore so that it cannot rotate relative to the connecting rod. However, additional securing means which permanently prevent the switching valve module from rotating or moving out of the receiving bore during the operation of the reciprocating internal combustion engine can also be necessary.

In this case, the portion inserted into the receiving bore has a length which is sufficient for preventing leaks from the oil return lines. Furthermore, an end of the module housing which protrudes from the receiving bore receives the control slide valve via the through-bore. The length of the end protruding over the connecting rod can consequently be varied and therefore designed in such a way that the ends of the control slide valve can cooperate in an intended manner with control elements which are designed for example as cam disks and are arranged in the crankcase. The portion of the module housing which protrudes over the connecting rod can also have a rectangular cross-section.

In contrast, in the switching valve according to DE 10 2012 112 461 A1, the slide valve is arranged in the housing in such a way that their longitudinal center axes extend coaxially. The switching valve is provided for arrangement within a receiving bore of the connecting rod, which receiving bore is designed as a through-bore. In this case, the longitudinal center axis of the receiving bore extends parallel to the longitudinal center axis of the connecting rod bearing eye, provided at the lower end of the respective cylinder sleeve and has the guide element receiving two guide grooves. The teeth of the rack portions and the control shaft form a linear drive in each case for each of the cam elements so that a rotation of the control shaft results in a corresponding longitudinal movement of the cam elements. Such a design of the actuator involves considerable construction effort and requires an installation space which, in most cases, is not available in the region of the connecting rod and the crank drive.

In a further configuration of the disclosure, the receiving bore in the connecting rod, which is provided for receiving the switching valve module, should be designed as a blind hole, wherein the oil return lines lead into the blind hole at the end face and wherein two return bores extending longitudinally in the switching valve module and communicating with the oil return lines start from an end face of the switching valve module. The module housing, which is produced for example from a shaft end, is firstly provided with the transversely extending through-bore, which is located in the vicinity of one end of the module housing. The two longitudinally extending return bores are then produced from the other end of the module housing, which return bores are connected to the through-bore. One of the two return bores can be connected to a discharge bore via the control slide valve inserted into the through-bore depending on the switching position of the said control slide valve. A 3/2-way valve is therefore formed in the case of one discharge bore and a 4/2-way valve is formed in the case of two discharge bores.

If, as is furthermore provided, the control slide valve is provided with a ridged latching portion, this should be provided centrally in the control slide valve and extend around its circumference. In this case, in the region of its two ends, in which the return bores lead into the through bore, the control slide valve should be guided in the through-bore by its outer lateral surface in a sealing manner, wherein, depending on the switching position of the control slide valve, one of the two return bores in each case is connected to a discharge bore via the recesses formed by the ridged latching portion.

Furthermore, according to the disclosure, the at least one discharge bore can be connected to a discharge channel which is provided within the connecting rod bearing housing and leads into the interior of the connecting rod bearing. Therefore, the pressure medium discharged from one of the two control cylinders via the discharge channel is returned to the connecting rod bearing, i.e. recuperated into the oil supply network. The pressure losses in the lubricating oil system, which could otherwise occur upon a switching of the adjusting device provided on the connecting rod, can thus be considerably reduced. A corresponding collecting chamber can be produced by a flattened portion or recess on the outer lateral surface of the module housing, wherein the two discharge bores, extending in a V shape starting from the through-bore, lead expediently into this collecting chamber. In this case, the collecting chamber is furthermore connected to a discharge channel which then leads into the interior of the connecting rod.

According to one embodiment of the disclosure, two latching grooves of the ridged latching portion should be delimited towards the ends of the control slide valve by annular flanks, wherein each of the flanks forms control edges together with the outer lateral surface. In this case, as is furthermore proposed, a cylindrical detent pin engaging in the ridged latching portion can be guided in a guide bore extending in the region of the longitudinal center axis of the switching valve module and is supported via a detent spring. From the two latching grooves, conically formed detent surfaces therefore extend to the center of the control slide valve, which detent surfaces form the ridged latching portion whilst the two latching grooves are delimited by the annular flanks in the direction of the ends of the control slide valve. Via its portions located outside the ridged latching portion, the control slide valve is guided in the through-bore in a sealing manner so that the return bores can be blocked via these portions. In this case, the transition from the respective annular flank to the outer lateral surface of the control slide valve serves as a control edge.

In addition to the two return bores, a centrically extending guide bore, in which the cylindrical detent pin is displaceably arranged, is consequently provided in the module housing. At its end, remote from the control slide valve, this detent pin, which has fallen against a detent spring designed as a pressure spring, moreover ensures an axial travel delimitation of the control slide valve since, upon reaching the switching position, its end abuts in each case against the corresponding annular flank of the latching groove.

Furthermore, at the end face of the switching valve module, a diaphragm spring seal can be arranged in each case between each of the oil return lines and the return bores associated therewith. Since the two diaphragm spring seals are provided at the transition of the oil return lines into the return bores, they can be produced with little manufacturing effort.

In this connection, it is also provided that the diaphragm spring seals are formed by a sheet metal cover fastened to the end face of the switching valve module, wherein the sheet metal cover then has diaphragm spring bores. In this case, the sheet metal cover having the diaphragm spring bores can be fastened in a simple manner to the end-face end of the module housing in that it has a hollow piston-like formation which can be produced without cutting and which is pressed into the centric guide bore explained above. The hollow piston-like formation moreover serves for the axial support of the detent spring.

Finally, the above-mentioned object should also be achieved in the case of a connecting rod for a reciprocating internal combustion engine having an adjustable compression ratio, the effective length of which connecting rod is adjustable in at least two stages for adjusting the compression ratio. This connecting rod is provided with at least one hydraulic control device for adjusting the effective length of the connecting rod, which control device has at least one eccentric body, arranged in a piston-side connecting rod eye of the connecting rod, at least two pressure chambers of supporting cylinders in which a control piston is displaceably guided in each case, which pressure chambers can be acted upon by a hydraulic fluid, and at least two piston rods which each connect a control piston to the eccentric body. In this case, the control device is adjustable via a switching valve. In this case, an arrangement and design of the switching valve module in the inventive configuration described above should be used.

This disclosure is not restricted to the indicated combination of features described herein. Moreover, further options arise for combining individual features with one another, and, thus, the figures should in no way restrict the scope of the disclosure to the exemplary configurations shown.

BRIEF DESCRIPTION OF THE DRAWINGS

For further explanation of the disclosure, please refer to the drawings in which two different exemplary embodiments are illustrated in simplified form. Within the drawings.

DETAILED DESCRIPTION

Figure 1:
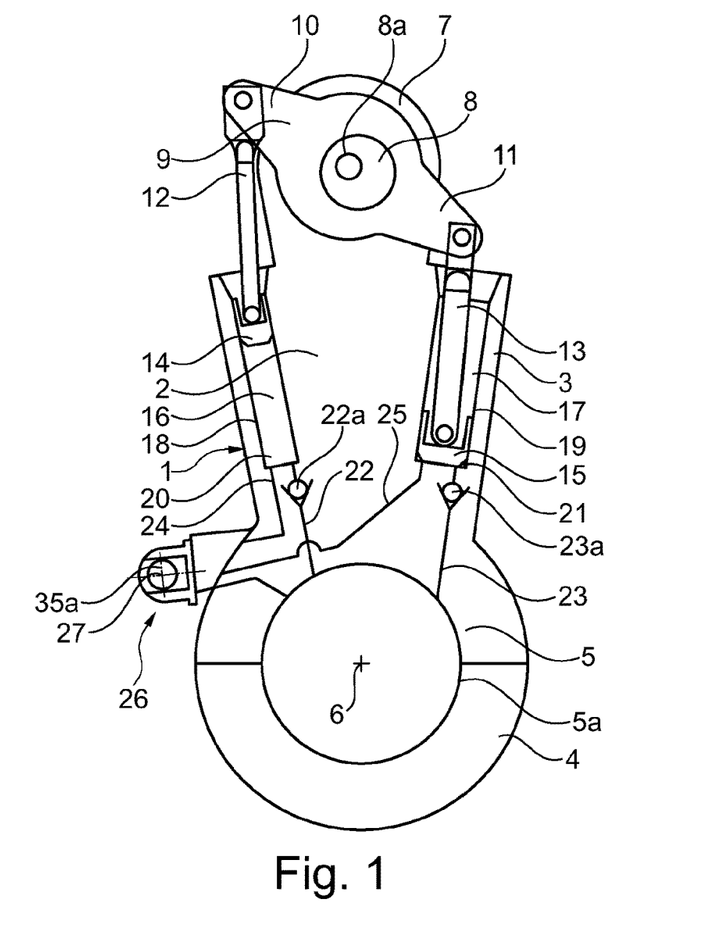
FIG. 1 is a schematic partial view of a connecting rod in longitudinal section, with an adjusting device which is associated with a connecting rod eye of the connecting rod and two control pistons, an eccentric body which is rotatable via an eccentric lever and a switching valve module according to the disclosure.

In FIG. 1, element 1 denotes a connecting rod for a cylinder unit of a reciprocating internal combustion engine, which connecting rod comprises a connecting rod upper part 3, formed partly as a connecting rod shaft 2, and a connecting rod lower part 4. The connecting rod upper part 3 and the connecting rod lower part 4 together form a connecting rod bearing housing 5 having a connecting rod bearing eye 5a, wherein the connecting rod bearing eye 5a has a longitudinal center axis 6 and the connecting rod 1 is mounted on a crankpin (not illustrated in more detail in FIG. 1) of a crankshaft via this connecting rod bearing eye. At its other end, the connecting rod upper part 3 is provided with a connecting rod eye 7, in which a piston pin (not illustrated in more detail) is arranged via an eccentric body 8 and a piston pin bearing 8a. Via the piston pin, which is rotatably guided in the piston pin bearing 8a, a working piston (likewise not illustrated) of a cylinder unit of the reciprocating internal combustion engine is guided on the eccentric body 8, wherein a rotation of the eccentric body 8 in one direction results in an adjustment for a relatively low compression ratio and a rotation thereof in the opposite direction results in an adjustment for a higher compression ratio.

The eccentric body 8 is adjusted by the forces of the drive mechanism which occur in the cylinder unit between the connecting rod 1 on the one hand and the piston pin and the crankpin on the other, i.e. inertial and gas forces. The acting forces change continuously during the working process of the cylinder unit. An eccentric lever 9, designed as a two-arm lever, is connected in a torsion-resistant manner to the eccentric body 8, which eccentric lever has diametrically extending arms 10 and 11, wherein these are each connected to single-acting control pistons 14 and 15 via piston rods 12 and 13. The control pistons 14 and 15 act on the eccentric body 8 via the above-mentioned components in order to enable a rotation of said eccentric body or to support it in the respective position. Therefore, the rotational movement of the eccentric body 8 can be supported by the control pistons 14 and 15 or its return movement, which would be brought by forces transmitted to the eccentric body 8 in different force directions can be prevented.

Together with cylinder bores 16 and 17 in which they are guided, the control pistons 14 and 15 form supporting cylinders 18 and 19, wherein each supporting cylinder 18 and 19 accommodates a pressure chamber 20 and 21. A lubricating oil, serving as hydraulic medium, of the reciprocating internal combustion engine can flow into the pressure chambers 20 and 21 from a connecting rod bearing arranged in the connecting rod bearing eye 5a via oil intake lines 22 and 23 in which non-return valves 22a and 23a are arranged. Furthermore, an oil return line 24 and 25 starts from each of the pressure chambers 20 and 21, which oil return lines both lead to a switching valve module 26 designed according to the disclosure, which extends transversely to the longitudinal center axis 6 of the connecting rod bearing eye. The switching valve module 26 has a control slide valve 27, which extends transversely thereto and consequently parallel to the longitudinal center axis 6 of the connecting rod bearing eye 5a.

Figure 2:
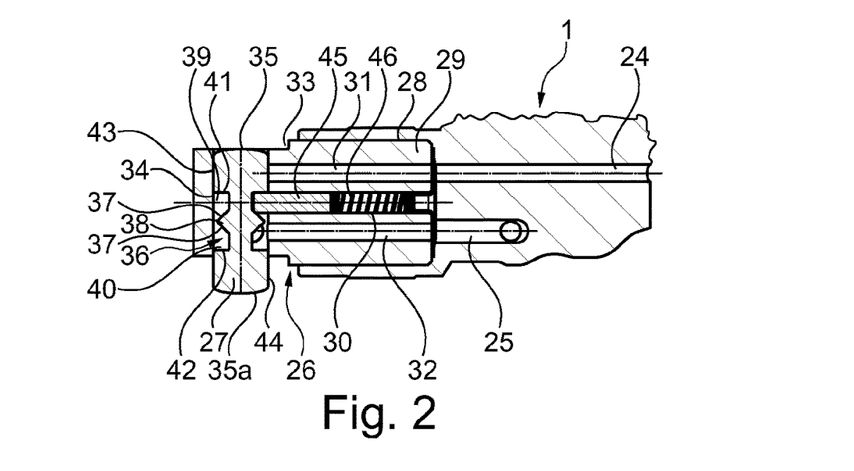
FIG. 2 is a partial view of the connecting rod with the switching valve module arranged therein in section.

In FIG. 2, the switching valve module 26 used according to FIG. 1 is illustrated in longitudinal section. This switching valve module 26, which is pressed into a receiving bore 28, designed as a blind hole of the connecting rod 1, has a cylindrical module housing 29, which can be produced from a shaft end. The illustration shows that the module housing 29 has a centrically extending guide bore 30 and, at a radial spacing therefrom, two return bores 31 and 32. In this case, the two return bores 31 and 32 are flush with ends of the two oil return lines 24 and 25 which are already explained in connection with FIG. 1.

The module housing 29 furthermore has an end portion 33 with a reduced external diameter, which end portion protrudes axially over the receiving bore 28 and therefore over the connecting rod 1. Located within this end portion 33 is a through-bore 34, which extends transversely to the longitudinal extent of the module housing 29 and in which the control slide valve 27 is longitudinally displaceably guided. This latter has end faces 35 and 35a and, as seen in the axial direction, a ridged latching portion 36 in its center, which comprises a latching elevation 38 having conical ramps 37 and latching grooves 39 and 40 located on both sides of this latching elevation. In the direction of the two ends of the control slide valve, the latching grooves 39 and 40 are each delimited by an annular flank 41 and 42. Moreover, the control slide valve has cylindrical outer lateral surfaces 43 and 44, which optionally block one of the return bores 31 or 32. In the illustration according to FIG. 2, the return bore 31 is blocked by the cylindrical outer lateral surface 43, whilst the return bore 32 is open with respect to the latching groove 40. The illustration furthermore shows that a detent pin 45 is arranged in the guide bore 30, which detent pin, in this case, engages in the latching groove 39 and thereby abuts against the annular flank 41. In this case, the detent pin 45 is supported relative to that end of the module housing 29 which is inserted into the receiving bore 28 via a detent spring 46.

Figure 3:
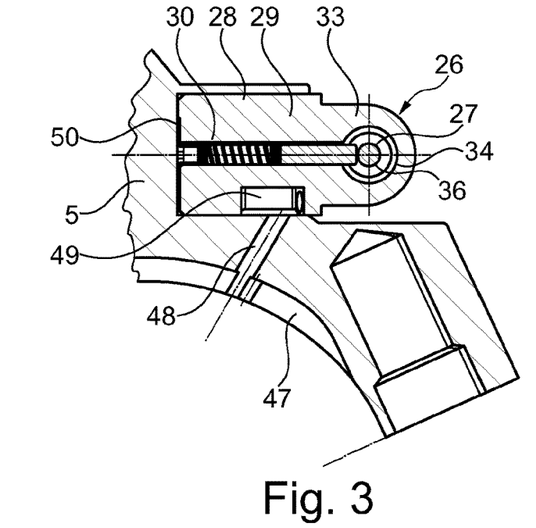
FIG. 3 is a cross-sectional partial view of an upper half of a connecting rod bearing housing, wherein the switching valve module arranged therein is connected via discharge bores to a discharge channel leading into a connecting rod bearing.

An arrangement of the switching valve module 26 in the connecting rod bearing housing 5, as is already illustrated in FIG. 1, is moreover shown in FIG. 3, wherein, in this case, a partial view of an upper half of the connecting rod bearing housing 5 is shown in section. According to this, the connecting rod bearing eye 5a has a lubricating pocket 47, into which a discharge channel 48 leads. In this case, this discharge channel 48 extending in the connecting rod bearing housing 5 starts from a collecting chamber 49 formed in the outer lateral surface of the switching valve module 26.

Figure 4:
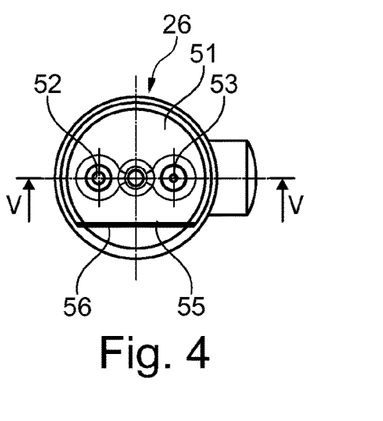
FIG. 4 is an enlarged end-face view of the switching valve module.
Figure 5:
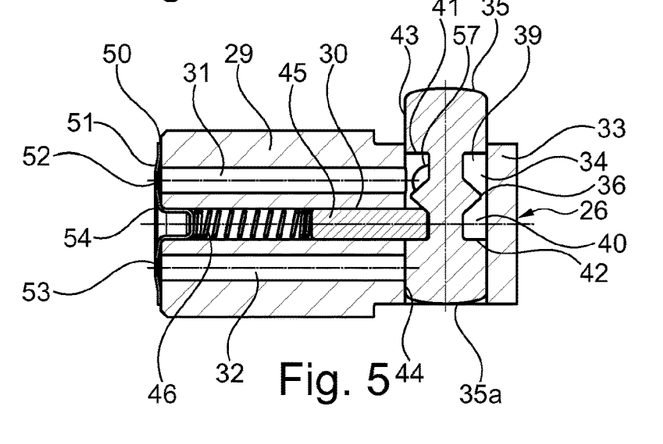
FIG. 5 is a longitudinal cross-sectional view according to line V-V through the switching valve module of FIG. 4.

In FIGS. 4 and 5, the switching valve module 26 is illustrated as a separate component, wherein this corresponds to the switching valve module 26 already illustrated in FIG. 2. In this case, this illustration of the switching valve module 26 on an enlarged scale shows that, at the end of the module housing 29 which is remote from the through-bore, a sheet metal cover 51 is fastened to an end face 50. The sheet metal cover 51 is provided with diaphragm spring bores 52 and 53, which are each located in the entry region of the return bores 31 and 32. In its center, the sheet metal cover 51 has a hollow cylindrical formation 54, which is pressed into the corresponding end of the guide bore 30. In this case, this hollow cylindrical formation 54 serves for supporting the detent spring 46. The corresponding end face 50 of the module housing 29 is shown in particular in FIG. 4. In this case, it is clear that the sheet metal cover 51 is guided on this end face 50 in a torsion-resistant manner in that it has a guide edge 55 which extends chordally and abuts against an edge 56 of the module housing 29.

Figure 6:
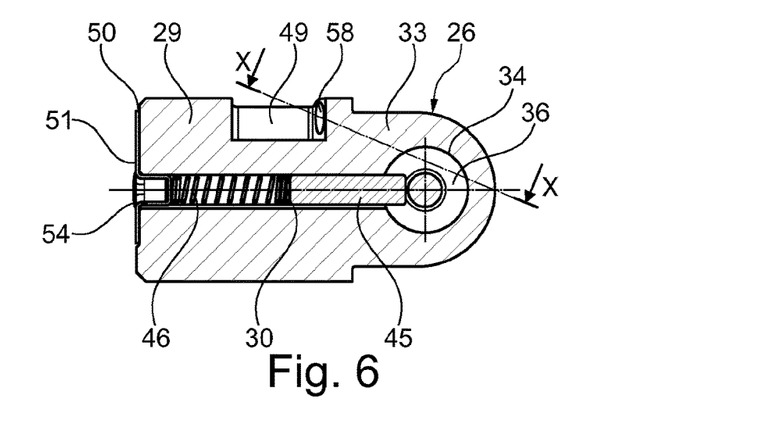
FIG. 6 is a cross-sectional view of the switching valve module of FIG. 5, rotated through 90°.
Figure 7:
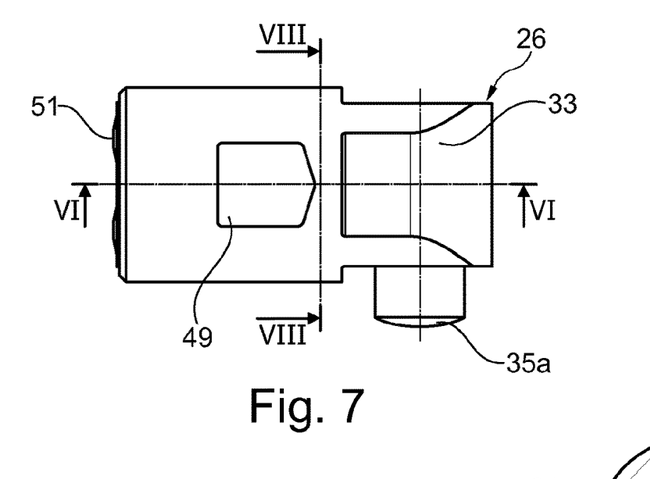
FIG. 7 is a plan view of the switching valve module, rotated through 90° relative to FIG. 6.
Figure 8:
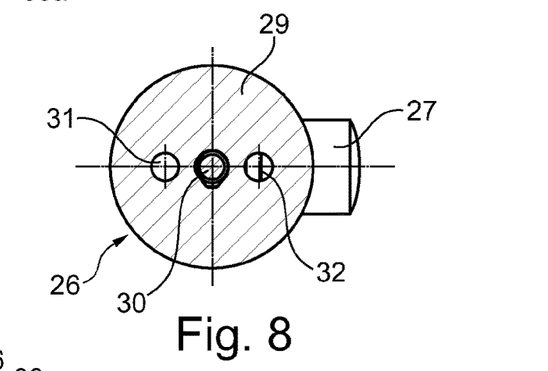
FIG. 8 is a cross-sectional view through the switching valve module according to line VIII-VIII in FIG. 7.
Figure 9:
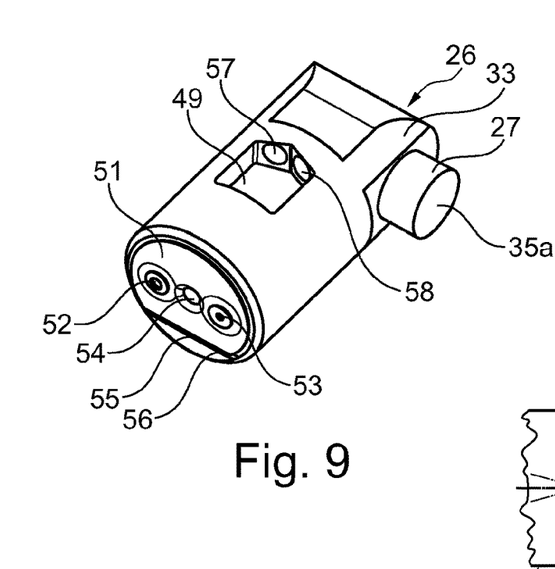
FIG. 9 is a perspective view of the switching valve module.
Figure 10:
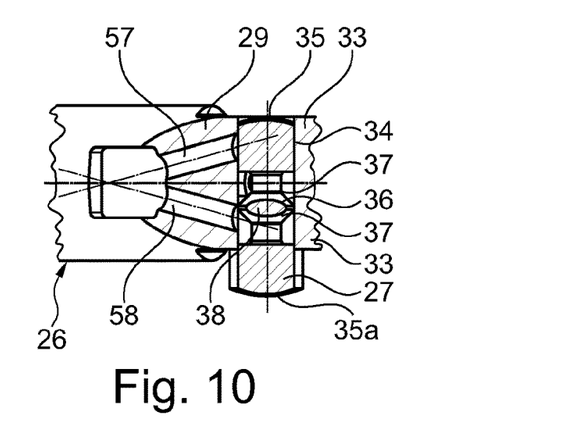
FIG. 10 is a partial cross-sectional view of the switching valve module in which the two discharge bores are visible.

FIG. 6 substantially illustrates a view of the switching valve module 26 of FIG. 3 on an enlarged scale. Furthermore, in FIG. 7, the switching valve module 26 is shown in a plan view, wherein the collecting chamber 49 is visible in this view. In the cross-section through the module housing 29 in FIG. 8, the return bores 31 and 32 and the guide bore 30 with the detent pin 45 arranged therein are visible. As shown in FIGS. 9 and 10, discharge bores 57 and 58, which start from the through bore 34, lead into the collecting chamber 49. In this case, these discharge bores have a V-shaped extent.

Figure 11:
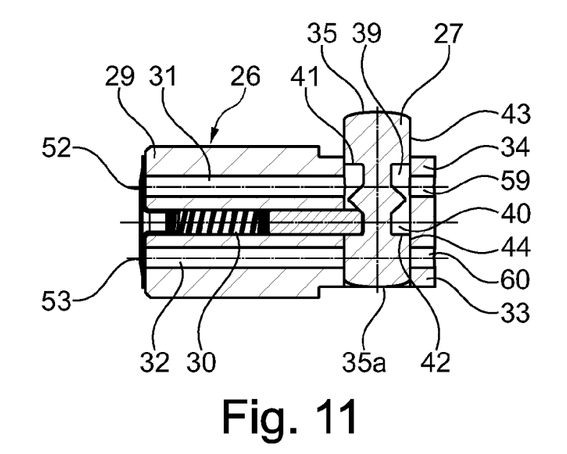
FIG. 11 is a longitudinal cross-sectional view of a further exemplary embodiment of a switching valve module whereof the discharge bores lead into the crankcase.
Figure 12:
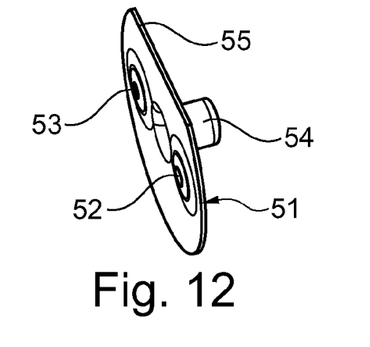
FIG. 12 is a perspective view of a sheet metal cover provided with diaphragm bores.
Figure 13:
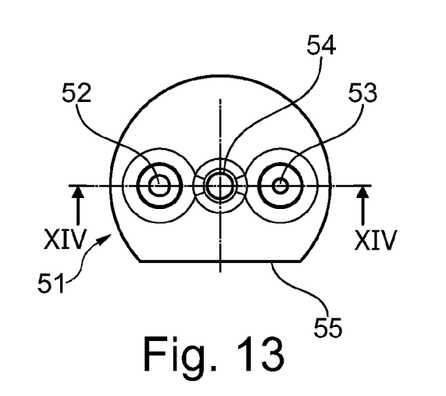
FIG. 13 is a plan view of the sheet metal cover.
Figure 14:
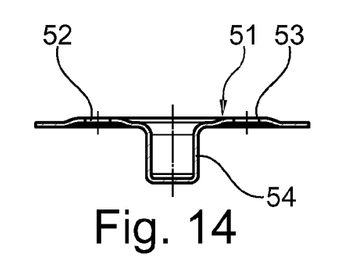
FIG. 14 is a longitudinal cross-sectional view through the sheet metal cover of FIG. 13 according to line XIV-XIV.

According to FIG. 11, in contrast to the arrangement described above, two discharge bores 59 and 60 are provided in the module housing 29, which discharge bores lead directly into the interior of a crankcase of the reciprocating internal combustion engine. Therefore, in contrast to the design of the switching valve module 26 described above, the pressure medium which is discharged in a controlled manner is now no longer supplied to the connecting rod bearing but makes its way into an oil pan of the reciprocating internal combustion engine. Finally, FIGS. 12, 13 and 14 show the design of the sheet metal cover 51, wherein it is clear that this has the corresponding diaphragm bores 52 and 53 and the hollow cylindrical formation 54.

LIST OF REFERENCE CHARACTERS

1 Connecting rod
2 Connecting rod shaft
3 Connecting rod upper part
4 Connecting rod lower part
5 Connecting rod bearing housing
5a Connecting rod bearing eye
6 Longitudinal center axis of 5
7 Connecting rod eye
8 Eccentric body
8a Piston pin bearing
9 Eccentric lever
10 Arm
11 Arm
12 Piston rod
13 Piston rod
14 Control piston
15 Control piston
16 Cylinder bore
17 Cylinder bore
18 Supporting cylinder
19 Supporting cylinder
20 Pressure chamber
21 Pressure chamber
22 Oil intake line
22a Non-return valve
23 Oil intake line
23a Non-return valve
24 Oil return line
25 Oil return line
26 Switching valve module
27 Control slide valve
28 Receiving bore
29 Module housing
30 Guide bore
31 Return bore
32 Return bore
33 End portion of 29
34 Through-bore
35 End face of 27
35a End face of 27
36 Ridged latching portion
37 Conical ramps
38 Latching elevation
39 Latching groove
40 Latching groove
41 Annular flank
42 Annular flank
43 Cylindrical outer lateral surface
44 Cylindrical outer lateral surface
45 Detent pin
46 Detent spring
47 Lubricating pocket
48 Discharge channel
49 Collecting chamber
50 End face of 29
51 Sheet metal cover
52 Diaphragm spring bore
53 Diaphragm spring bore
54 Hollow cylindrical formation
55 Chordal guide edge
56 Edge
57 Discharge bore
58 Discharge bore
59 Discharge bore
60 Discharge bore

The invention claimed is:

1. A switching valve module configured to be arranged within a receiving bore of a connecting rod to control an adjusting device for changing a compression ratio of a cylinder unit of a reciprocating internal combustion engine, the device connectable via oil return lines to two pressure chambers of supporting cylinders of the adjusting device and to at least one discharge bore, the switching valve module comprising: a module housing having a cylindrical outer contour, at least in sections, and a through-bore extending transversely to the longitudinal extent of the module housing, the cylindrical outer contour configured to be inserted within the receiving bore, the receiving bore extending transversely to a longitudinal center axis of a connecting rod bearing eye; and, a control slide valve longitudinally displaceable within the through-bore to two different switching positions, the control slide valve having two end-faces that are configured to be actuated by at least one actuator.

2. The switching valve module of claim 1, further comprising a first and a second longitudinal return bore arranged in the module housing that extend from the through-bore to an end-face of the module housing, the module housing configured to be inserted within a blind receiving bore having an end-face; and,
the first and second longitudinal return bores are configured to communicate with respective first and second oil return lines that start from the end-face of the blind receiving bore.

3. The switching valve module of claim 2, further comprising a first and a second diaphragm spring seal arranged on an end-face of the module housing, the first diaphragm spring seal located between the first oil return line and the first longitudinal return bore, and the second diaphragm spring seal located between the second oil return line and the second longitudinal return bore.

4. The switching valve module of claim 3, further comprising a sheet metal cover connected to the end-face of the module housing, the sheet metal cover including the first and second diaphragm spring seals.

5. The switching valve module of claim 1, wherein:
the module housing further comprises at least two longitudinal return bores that extend from the through-bore to an end-face of the module housing;
the control slide valve further comprises:
a centrally located ridged latching portion having latching grooves;
an outer lateral surface that guides the control slide valve within the through-bore; and,
two ends that are configured to sealingly engage or disengage the at least two longitudinal return bores, that, depending on the switching position of the control slide valve, one of the at least two longitudinal return bores connects to at least one discharge bore via the latching grooves.

6. The switching valve module of claim 5, wherein at least one discharge bore is configured to be connected to at least one discharge channel provided within the connecting rod bearing housing, the at least one discharge channel leading to an interior of the connecting rod bearing provided in the connecting rod bearing eye.

7. The switching valve module of claim 6, wherein two discharge bores lead into a collecting chamber provided in an outer lateral surface of the module housing.

8. The switching valve module of claim 5, wherein two grooves of the ridged latching portion are delimited towards the ends of the control slide valve by annular flanks, each of the flanks forming control edges together with the outer lateral surface.

9. The switching valve module of claim 5, further comprising:
- a longitudinal guide bore that extends in a region of a longitudinal center axis of the switching valve module; and,
- a detent pin guided in the longitudinal guide bore, the detent pin supported by a detent spring and configured to engage the ridged latching portion of the control slide valve.

10. The switching valve module of claim 9, further comprising a sheet metal cover connected to an end-face of the module housing, the sheet metal cover having a hollow cylindrical formation that supports the detent spring.

11. A connecting rod for a reciprocating internal combustion engine having an adjustable compression ratio, an effective length of the connecting rod adjustable in at least two stages, the connecting rod comprising: at least one hydraulic control device for adjusting the effective length of the connecting rod; the at least one hydraulic control device having: at least one eccentric body, arranged in a piston-side connecting rod eye of the connecting rod; at least two pressure chambers of supporting cylinders within which a control piston is displaceably guided, the at least two pressure chambers acted upon by hydraulic fluid; at least two piston rods that connect a control piston to the eccentric body; and, a switching valve module including: a module housing having a cylindrical outer contour, at least in sections, and a through-bore extending transversely to the longitudinal extent of the module housing, the cylindrical outer contour configured to be inserted within a receiving bore of the connecting rod which extends transversely to a longitudinal center axis of a connecting rod bearing eye; and, a control slide valve longitudinally displaceable within the through-bore to two different switching positions, the control slide valve having two end-faces that are configured to be actuated by at least one actuator.

* * * * *